(12) United States Patent
Han et al.

(10) Patent No.: US 10,190,041 B2
(45) Date of Patent: Jan. 29, 2019

(54) ENCAPSULATED POROUS PROPPANT

(71) Applicant: University of Utah Research Foundation, Salt Lake City, UT (US)

(72) Inventors: Kyu-Bum Han, Salt Lake City, UT (US); John Fuertez, Salt Lake City, UT (US); John McLennan, Salt Lake City, UT (US); Taylor D. Sparks, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 15/612,659

(22) Filed: Jun. 2, 2017

(65) Prior Publication Data

US 2018/0037810 A1 Feb. 8, 2018

Related U.S. Application Data

(60) Provisional application No. 62/370,136, filed on Aug. 2, 2016.

(51) Int. Cl.
*C09K 8/60* (2006.01)
*C09K 8/80* (2006.01)
*C09K 8/582* (2006.01)

(52) U.S. Cl.
CPC .............. *C09K 8/805* (2013.01); *C09K 8/582* (2013.01)

(58) Field of Classification Search
CPC ................ C09K 8/805; C09K 2208/26; C09K 2208/10; C09K 2208/12; C09K 2208/20; C09K 2208/32; C09K 8/524; C09K 8/528; C09K 8/605; C09K 8/80; C09K 2208/06; C09K 2208/22; C09K 2208/24; C09K 2208/28; C09K 8/035; C09K 8/602; C09K 8/604; C09K 8/70; C09K 8/882; C09K 8/885; C09K 8/905; C09K 8/92
See application file for complete search history.

(56) References Cited

U.S. PATENT DOCUMENTS

| | | |
|---|---|---|
| 5,397,759 A | 3/1995 | Torobin |
| 6,107,067 A | 8/2000 | Miller et al. |
| 7,426,961 B2 | 9/2008 | Stephenson et al. |
| 7,828,998 B2 | 11/2010 | Luscher et al. |

(Continued)

FOREIGN PATENT DOCUMENTS

| | | | |
|---|---|---|---|
| WO | WO-2013059793 A1 * | 4/2013 | .......... E21B 43/267 |
| WO | 2015021083 | 2/2015 | |
| WO | 2016014310 | 1/2016 | |

OTHER PUBLICATIONS

Liang et al., "A comprehensive review on proppant technologies," Petroleum, 2016, vol. 2, pp. 26-39.

*Primary Examiner* — Alexandre F Ferre
(74) *Attorney, Agent, or Firm* — Workman Nydegger

(57) ABSTRACT

The present disclosure describes proppant materials encapsulated with a polymer encapsulation layer. Proppant particles are formed with a core having relatively larger inner pores and a shell having relatively smaller shell pores. The shell pores and/or inner pores can be loaded with a treatment product, such as a methanogenic microbial consortium capable of converting coal into methane. The polymer encapsulation layer surrounds the shell and provides for sustained time-release of the treatment product when the proppant material has been delivered to a subterranean formation.

14 Claims, 7 Drawing Sheets

(56) References Cited

U.S. PATENT DOCUMENTS

| | | | |
|---|---|---|---|
| 7,976,949 B2 | 7/2011 | Dickson et al. | |
| 8,063,000 B2 | 11/2011 | Wilson | |
| 8,409,822 B2 | 4/2013 | Trevino et al. | |
| 8,496,057 B2 | 7/2013 | Ferrero et al. | |
| 8,614,157 B2 | 12/2013 | Pope et al. | |
| 8,727,003 B2 | 5/2014 | Li et al. | |
| 9,175,210 B2 | 11/2015 | Eldred et al. | |
| 2006/0162929 A1 | 7/2006 | Urbanek | |
| 2007/0202318 A1* | 8/2007 | Smith | B01J 13/02 428/323 |
| 2012/0277130 A1* | 11/2012 | Usova | C04B 33/04 507/269 |
| 2016/0009980 A1 | 1/2016 | Gupta et al. | |
| 2016/0068744 A1 | 3/2016 | Cannan et al. | |
| 2016/0075941 A1* | 3/2016 | Duenckel | C09K 8/805 166/280.2 |
| 2017/0335177 A1* | 11/2017 | Bottiglieri | C09K 8/805 |

\* cited by examiner

ENCAPSULATED POROUS PROPPANT

CROSS-REFERENCE TO RELATED APPLICATIONS

This application claims priority to and the benefit of U.S. Provisional Patent Application Ser. No. 62/370,136, filed on Aug. 2, 2016 and titled "ENCAPSULATED POROUS PROPPANT," the disclosure of which is incorporated herein by this reference in its entirety.

STATEMENT REGARDING FEDERALLY FUNDED RESEARCH

This invention was made with government support under DE-FE0024088 awarded by the Department of Energy. The government has certain rights in the invention.

BACKGROUND

A proppant is a solid material typically intended for delivery into a subterranean formation for the purpose of enhancing or maintaining the hydraulic conductivity of the subterranean formation. Proppant materials are often utilized to keep hydraulic fractures open following treatment with a fracturing fluid. Proppant materials require sufficient mechanical strength to withstand closure stresses and hold open a fracture, but also must be sufficiently permeable to allow release and conduction of gas or oil to the surface.

When proppant particles are crushed they generate fines, which can detrimentally reduce the permeability of the treated seam. In many circumstances, a primary challenge is disaggregated formation fines reducing proppant pack conductivity. Proppant materials of high strength can minimize proppant crushing and the generation of such fines. However, higher proppant strength typically requires a proppant material with a higher density, and such higher density proppant materials demand higher pumping rates and higher operating and material costs.

Proppant materials are also routinely utilized in hydraulic fracturing of coal reservoirs. Many coal reservoirs are geologically situated in ways that make it difficult to safely, economically, and environmentally mine the coal. In some situations, wellbores are drilled to allow the release of methane adsorbed to the coal, which only recovers the naturally produced methane. Conventional approaches for such extraction are limited to the recoverable amount of methane within the coalbed, and yields are often hampered by inability to adequately and economically draw down wells. The quantities of gas recovered are minimal as compared to the amount of coal remaining in the reservoir. Thus, despite high infrastructure investment involved in drilling and stimulating production, wells must be plugged and abandoned as methane production declines, leaving large amounts of existing hydrocarbons and latent hydrocarbons (solid coal) unexploited.

BRIEF SUMMARY

The present disclosure relates to encapsulated porous proppant compositions. Some embodiments are suitable for use as delivery mechanisms for delivering one or more treatment products to a subterranean environment/formation. Some embodiments may be utilized for maintaining hydraulic fracturing conductivity by resisting fracture closure. Subsurface environments to which encapsulated porous proppant compositions may be applied include, for example, hydrocarbon reservoirs (e.g., oil, coal, gas, oil shale, oil sands), geothermal reservoirs, aquifers, and the like. Treatment products delivered by the encapsulated porous proppant compositions may include bacteria, nutrients, surfactants, clay control additives, and/or well stimulants, for example. In some embodiments, encapsulated porous proppant compositions are loaded with microbial consortia configured to enhance the generation of methane within a hydrocarbon reservoir.

Certain embodiments may be utilized in coalbeds or similar carbonaceous environments in order to maintain conductivity through proppant packs. Such proppant packs may also be configured to cause biogasification of the coal, thereby increasing methane yields from the treated coalbed. Proppant compositions disclosed herein are particularly useful in circumstances where coal cannot be easily extracted from the coalbed. Some of these "unmineable" coalbeds include an amount of methane (typically referred to as coalbed methane, coal seam gas, or coalbed gas) adsorbed onto the solid matrix of the coal. Production wells may be established in the coalbed to extract this methane. Often, the gas production of the coalbed is increased through hydraulic fracturing and delivery of a proppant material to increase and/or maintain the hydraulically opened fractures in the coalbed.

However, even when such a well system can be put in place, yields will be limited to the recoverable amount of adsorbed methane, as the coal itself will remain in-situ. Further, pack permeability can degrade if fine coal particulates are "plucked" from the producing formation and become filtered/lodged into the granular proppant pack. Certain embodiments of encapsulated, porous proppant compositions described herein are configured to increase or maintain proppant pack permeability while also delivering one or more treatment products (e.g., a methanogenic microbial consortia) to the coalbed. Such proppant compositions beneficially enable sustained and potentially enhanced recovery by converting the solid and often unrecoverable coal into recoverable methane.

Coal breakdown and conversion can be accomplished within the coalbed itself and/or within the proppant pack. For example, coal fines within the proppant pack can be at least partially broken down and converted into methane through action of the delivered bacterial consortium and/or other treatment product. In addition, to converting the unrecoverable coal into recoverable gas, such action assists in maintaining permeability within the proppant pack.

Additional features and advantages will be set forth in part in the description that follows, and in part will be obvious from the description, or may be learned by practice of the embodiments disclosed herein. The objects and advantages of the embodiments disclosed herein will be realized and attained by means of the elements and combinations particularly pointed out in the appended claims. It is to be understood that both the foregoing brief summary and the following detailed description are exemplary and explanatory only and are not restrictive of the embodiments disclosed herein or as claimed.

BRIEF DESCRIPTION OF THE DRAWINGS

In order to describe various features and concepts of the present disclosure, a more particular description of certain subject matter will be rendered by reference to specific embodiments which are illustrated in the appended drawings. Understanding that these figures depict just some example embodiments and are not to be considered to be limiting in scope, various embodiments will be described and explained with additional specificity and detail through the use of the accompanying drawings in which.

DETAILED DESCRIPTION

Exemplary embodiments described herein are most often directed to encapsulated porous proppant compositions configured to deliver a methanogenic microbial consortium to a coalbed environment to initiate or increase methane production. However, it will be understood that the features and components described herein may also be utilized for other applications and/or in other environments. For example, one or more of the encapsulated porous proppant compositions described herein may be utilized for delivering other types of microbial and/or chemical loads (e.g., for pollutant conversion and/or bioremediation purposes). One or more proppant compositions described herein may be utilized in other subterranean formations, such as oil reservoirs (including heavy oil reservoirs and immature oil reservoirs), aquifers, subsurface soil environments, and the like.

Figure 1:
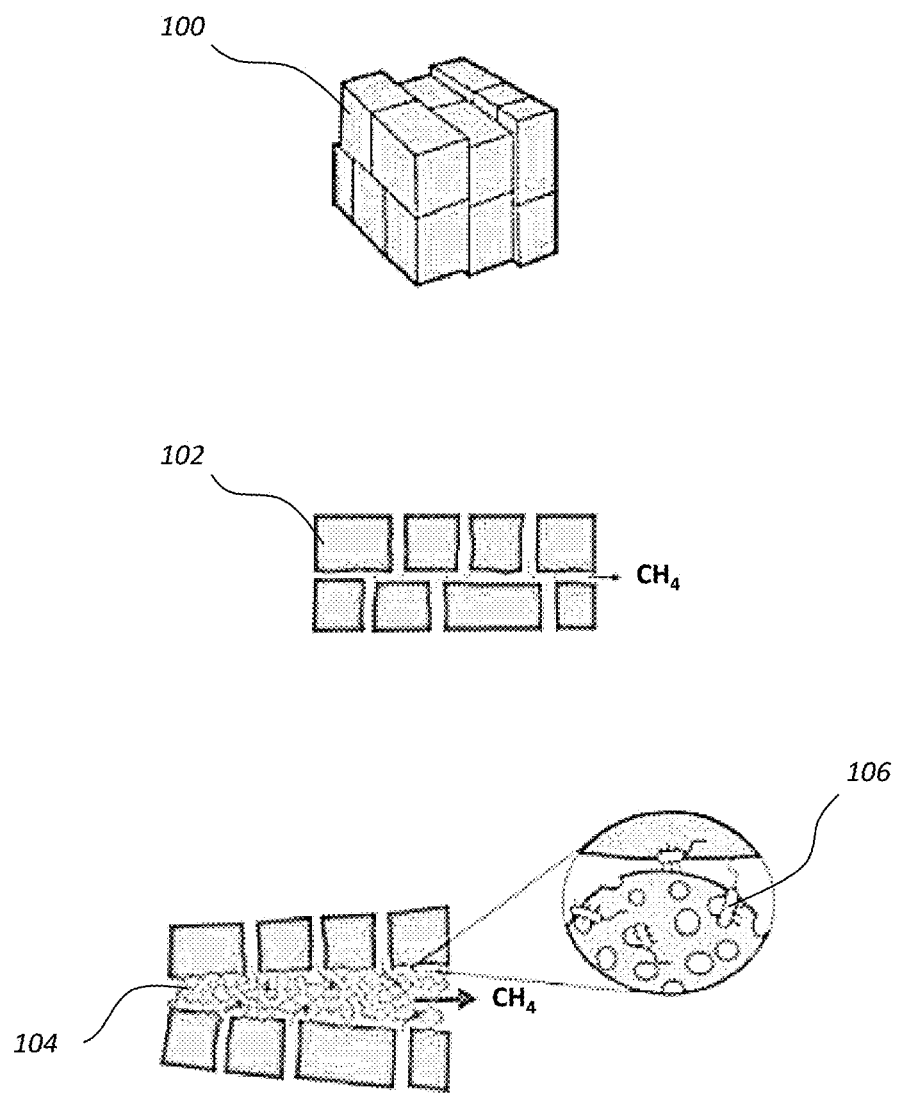
FIG. 1 illustrates application of a proppant material to a coal cleat system, including delivering methanogenic bacteria to the coal cleat system.

FIG. 1 schematically illustrates a coalbed 100 having a network of cleats, which may be naturally occurring or enhanced through fracturing. In a typical coalbed methane extraction process, water is pumped from the coalbed to reduce in-situ pressure in the cleat system. This pressure reduction causes methane to desorb from the coal matrix and move through the network cleats. As shown by 102, an amount of methane may be recovered as a result of methane desorption.

The permeability of a hydraulic fracture network draining the coal cleat system may be enhanced and maintained through the addition of proppant material 104, which can thereby increase the hydraulic conductivity and the recovery of the desorbed methane. The proppant material 104 may be utilized to deliver a treatment product to the coalbed. For example, as shown, microbes 106 may be delivered to the coalbed within the proppant material 104. As described in more detail below, the microbial load may be tailored to consume the coal and convert it into methane, which may then be recovered from the coalbed. The microbial load may function to breakdown and convert coal within the cleat network as well as fine particulates accumulating in the proppant pack itself. The breakdown and conversion of fine particulates within the proppant pack aids in maintaining the permeability of the proppant pack and thereby enables better conduction of the methane.

Methane extraction processes such as those illustrated in FIG. 1 enable effective recovery of valuable energy resources. For example, coalbeds that cannot be directly mined because of technological barriers, unfavorable geological conditions, environmental concerns, or political difficulties may be treated to generate recoverable methane in a manner that overcomes these limitations.

Further, even in circumstances in which coal from a coalbed is recoverable, conversion of at least a portion of the coal or low-grade waste material using one or more of the embodiments described herein can provide a number of benefits, including reducing the land impact from mining of the coal and providing a methane product that is cleaner than the coal itself. For example, an electrical generation plant using methane (i.e., natural gas) is known to emit less greenhouse gas, $NO_x$, $SO_2$, mercury, soot, and other solid particulates than a typical coal-fired plant given the same energy output. Furthermore, methane plants use 60% less water than coal-fired plants and use the smallest land per megawatt capacity (20 times less than wind and solar).

At least some embodiments may also be useful for maintaining coal cleat permeability and proppant pack permeability. In particular, proppant pack permeability may be maintained or improved through the degradation of accumulated coal fines. Microbial elimination of coal fines can assist in maintaining proppant pack conductivity in a fracture. Maintaining sufficient conductivity is beneficial for assisting the flow of desorbed methane whether or not there is any associated biogasification of the surrounding coal.

Other treatment products may be delivered to a targeted subterranean formation in addition to or as an alternative to the microbial load. For example, one or more nutrients, well stimulants, enzymes (e.g., for breaking/degrading the viscosity of hydraulic fracturing fluids), oxidizing agents (e.g., ammonium persulfate or other oxidizing agents known in the art), pH adjusting agents, surfactants (e.g., for improving flowback of fracturing fluids), and combinations thereof may be included in the proppant materials. In some embodiments, the proppant materials include nutrients/stimulants configured to enhance the activity (e.g., methanogenic activity) of native microbial populations within the coalbed.

Figure 2:
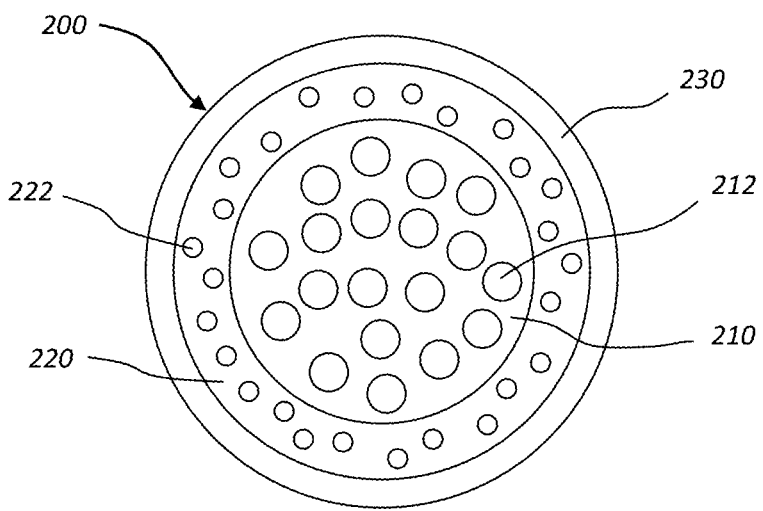
FIGS. 2 and 3 illustrate exemplary proppant particles each having dual porosity and a polymer encasement.

FIG. 2 illustrates an exemplary proppant particle 200 configured to house a microbial load and/or other treatment product. The illustrated proppant particle 200 includes an inner core 210 formed of a first material and having a plurality of inner pores 212, and a shell 220 formed of a second material and having a plurality of surface or shell pores 222.

In preferred embodiments, the inner core 210 and the outer shell 220 of the encapsulated proppant are formed from ceramic materials, such as oxide-based ceramic materials. In preferred embodiments, the inner core 210 and the outer shell 220 are independently formed of different ceramic materials. In alternative embodiments, the proppant material may be formed from wood or bauxite, for example, which may then be encapsulated.

In some embodiments, the inner core 210 and/or the outer shell 220 are formed of one or more ceramic oxides, carbides, and/or nitrides. The oxides, carbides, and/or nitrides may be of boron, silicon, zinc, other metals, non-metals, or metalloids, for example. In one embodiment, the inner core 210 and the outer shell 220 are formed from a phyllosilicate (e.g., a clay mineral) or a ceramic material mixed with a phyllosilicate. In a preferred embodiment, the inner core 210 is formed from an iron oxide (e.g., $Fe_2O_3$) and kaolinite mixture. In a preferred embodiment, the outer shell 220 is formed from an aluminum oxide (e.g., $Al_2O_3$).

As shown, the inner pores 212 have an average size (i.e., average diameter) that is larger than an average size of the shell pores 222. As explained in more detail below, this dual porosity advantageously provides the proppant particle 200 with desirable density while also providing a number of suitably sized and suitably situated delivery pores for the delivery of microbes and/or other treatment products to the targeted subterranean formation. For example, the larger inner pores 212 may be configured with a large size to reduce the overall density of the proppant particle 200, while the smaller shell pores 222 have a reduced size (allowing greater surface area) to better hold and carry the treatment product intended for delivery to the subterranean formation.

The dual porosity configuration of the proppant particle 200 maximizes the benefits of each separate function by locating the larger, density-lowering inner pores 212 within the bulk of the proppant particle 200 and locating the smaller, product-carrying shell pores 222 closer to the outer surface of the proppant particle 200 where the treatment product can more readily diffuse or be carried away from the proppant particle 200 and into the coalbed.

The illustrated proppant particle 200 also includes a polymer encapsulation layer 230. In some embodiments, the encapsulation layer 230 is configured to provide timed release of the treatment product upon injection of the proppant particle 200 into the coalbed or other targeted environment. As explained in more detail below, the encapsulation layer 230 is preferably formed from a polymer configured to coat the proppant surface so as to encapsulate the treatment product loaded within the proppant particle 200 (e.g., a microbial consortium loaded within the shell pores 222), and to break down over time when exposed to the target environment to allow sustained release of the loaded product into the surrounding environment.

The encapsulation layer 230 can be configured to provide time-release capabilities so that the treatment product is releasable through one or more of diffusion, dissolution, osmosis, and ion exchange mechanisms, for example. In some embodiments, the encapsulation layer 230 is formed from and/or includes calcium alginate. Other embodiments may include other materials, such as sodium alginate, other alginate salts, shellac, gelatins, proteins, polysaccharides, carrageenan, starch (e.g., glycolate), cellulose, methylcellulose, glycerin, and/or synthetic polymers such as polyvinylpyrrolidone (PVP) and polyethylene glycol (PEG).

In some embodiments, an average proppant size is within a range of about 150 μm to about 2 mm. In some embodiments, for example, the proppant has a size according to a Tyler sieve size of 200 mesh to No. 8, or 100 mesh to No. 10. In some embodiments, the polymer encapsulation layer has a thickness of about 0.05 mm to about 0.5 mm, or about 0.1 mm to about 0.25 mm, or about 0.1 mm to about 0.2 mm.

In some embodiments, the encapsulation layer 230 includes growth media for promoting growth of microbes loaded within the proppant material and/or natively located within the treated subterranean formation. In preferred embodiments, a complex growth media is utilized. In particular, effective growth of a preferred methanogenic microbial consortium has been shown using tryptic soy broth (TSB). A thioglycolate salt may also be added to the growth media to consume oxygen and better tailor the growth media to anaerobic growth. Other growth medias may also be utilized, including other complex growth media (e.g., blood, yeast extract, bile, peptone, serum, and/or starch containing medias) or defined growth media.

In one embodiment, one or more of the following components are included: sodium acetate (e.g., at a concentration of about 1.23 g/L to about 2.5 g/L); yeast extract (e.g., at a concentration of about 1 g/L to about 1.25 g/L); sodium lactate (e.g., at a concentration of about 6.67 mL/L); ammonium chloride (e.g., at a concentration of about 0.5 g/L); potassium phosphate (e.g., at a concentration of about 0.5 g/L to about 1 g/L); magnesium sulfate (e.g., at a concentration of about 0.2 g/L); calcium chloride (e.g., at a concentration of about 0.1 g/L); and sodium sulfate (e.g., at a concentration of about 0.5 g/L).

In preferred embodiments, the growth media is added as a solution to the encapsulation layer at a concentration of about 20 g/L to about 40 g/L, or about 25 g/L to about 35 g/L. In preferred embodiments, the sodium chloride concentration of the growth media is no more than about 5.5 g/L.

Figure 3:
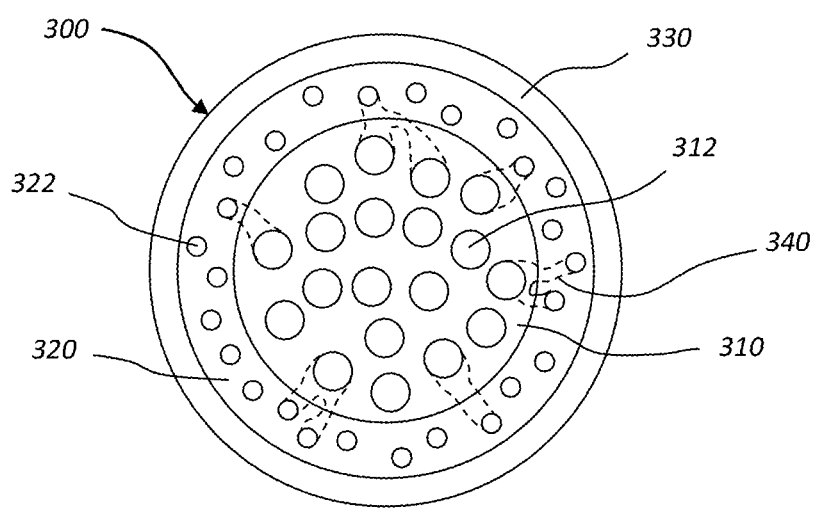

FIG. 3 illustrates an alternative embodiment of a proppant particle 300. The proppant particle 300 may be configured in a fashion similar to the proppant particle 200 of FIG. 2. Like the proppant particle 200, the proppant particle 300 includes a core 310 with inner pores 312, a shell 320 with shell pores 322, and a polymer encapsulation layer 330. As shown, the shell pores 322 are relatively smaller than the inner pores 312. The illustrated proppant particle 300 also includes channels 340 which are configured so that at least a portion of the inner pores 312 are in fluid communication with at least a portion of the shell pores 322. With this type of proppant particle 300, at least some of the inner pores 312 may be utilized to house the treatment product. The relatively larger size of the inner pores 312 therefore provides a reservoir of treatment product which can freely percolate into connected shell pores 322 as the shell pores 322 release a treatment product into and through the encapsulation layer 330 over time.

A preferred microbial consortium includes, in addition to methanogenic bacteria, a mixture of fermentative bacteria and acetogenic bacteria to provide sufficient conversion of complex hydrocarbons to $H_2$ and $CO_2$ (and in some circumstances acetate and formate as well) which can then be utilized by the methanogenic bacteria to drive methanogenesis. For example, effective results have been shown using a consortium including *Clostridium, Tissierella,* and/or *Rhodococcus* spp., which are capable of generating $CO_2$ and $H_2$ for driving the downstream methanogenic reactions.

In some embodiments, the microbial consortium also includes *Desulfitobacterium* bacteria. *Desulfitobacterium* bacteria are versatile in their use of different electron acceptors and can beneficially assist in stabilizing the syntrophic relationships among different metabolic types within the microbial consortium.

In some embodiments, the microbial consortium includes, as a percentage of population of the consortium, about 1% to 10%, or about 2% to 5% methanogenic bacteria. In some embodiments, the microbial consortium includes, as a percentage of population of the consortium, about 15% to about 40% fermentative and/or acetogenic bacteria including one or more *Clostridium, Tissierella,* and/or *Rhodococcus* spp. In some embodiments, the microbial consortium includes, as a percentage of population of the consortium, about 20% to 50%, or about 30% to 40% *Desulfitobacterium* spp.

Figure 4:
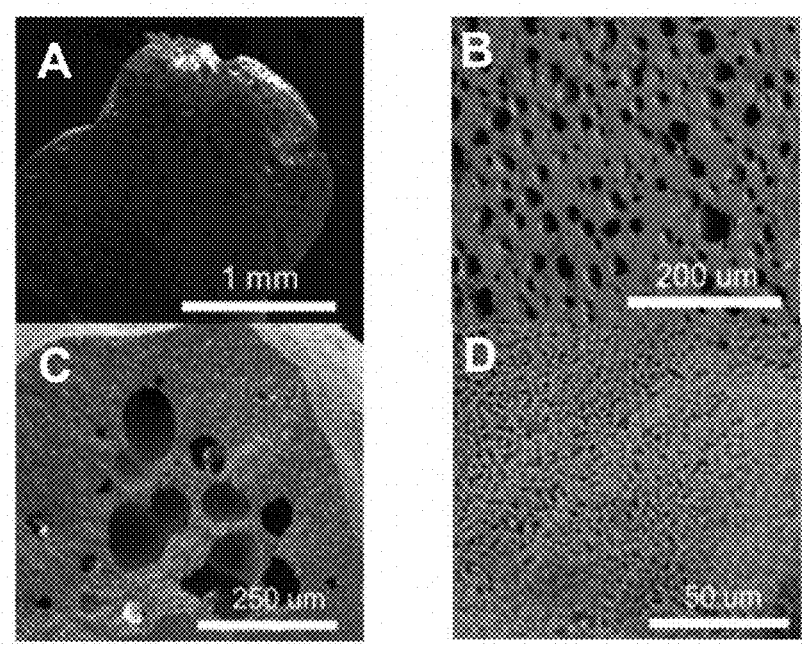
FIG. 4 shows scanning electron microscope (SEM) images of a proppant core without a shell and a proppant core with shell.

FIG. 4 illustrates scanning electron microscope (SEM) images of various proppant particles. Image A shows a proppant core (without shell or polymer encapsulation) formed from an iron oxide and kaolinite mixture (shown at 40× magnification). Image B is a closer view (150× magnification) of the proppant core of image A showing the inner, relatively large pores of the core. The depicted inner core pores measure about 24 μm (±12 μm). In other embodiments, the average size of the inner pores is larger, such as about 30 to 60 μm, or about 45 μm.

In some embodiments, the proppant core has a bulk density of about 2.5 g/cm$^3$ or lower, about 2.25 g/cm$^3$ or lower, about 2.0 g/cm$^3$ or lower, about 1.7 g/cm$^3$ or lower. Preferred embodiments have a bulk density as low as about 1.4 g/cm$^3$. In some embodiments, the proppant core has an open porosity of about 7 percent or greater, about 10 percent or greater, or about 15 percent or greater. In some embodiments, the pores of the proppant core cover about 20% to 60%, or about 30% to 50% of the surface area of a cross-section of the core. These densities and/or open porosity levels beneficially prevent settlement of the proppant while being carried in a hydraulic fracturing fluid and enable better utilization of the proppant materials in fractures, cleats, and other subterranean formations.

Image C shows a cross-section of a proppant particle having an inner core and an outer shell section formed from aluminum oxide (180× magnification). In the view of image C, the larger, inner pores near the interior of the proppant are distinctly visible. Image D is an expanded view (600× magnification) of the outer surface of the proppant of image C, showing the relatively smaller shell pores that are suitable for carrying a microbial load and/or other treatment product. The depicted shell pores measure about 8 μm (±3 μm). Preferred shell pores range in size from about 3 μm to about 20 μm, or about 5 μm to 15 μm.

The terms "approximately," "about," and "substantially" as used herein represent an amount or condition close to the stated amount or condition that still performs a desired function or achieves a desired result. For example, the terms "approximately," "about," and "substantially" may refer to an amount or condition that deviates by less than 10%, or by less than 5%, or by less than 1%, or by less than 0.1%, or by less than 0.01% from a stated amount or condition.

Elements described in relation to any embodiment depicted and/or described herein may be substituted for or combined with elements described in relation to any other embodiment depicted and/or described herein. For example, any of materials, material properties, or size descriptions described in relation to the embodiment of FIGS. 2 and/or 3 may be utilized with any of the alternative embodiments illustrated or described herein.

EXAMPLES

The following examples illustrate various embodiments in which one or more of the principles described in this disclosure may be implemented. It will be understood that the following examples are provided for illustrative purposes only, and are not to be read as limiting. In addition, some of the examples described below relate to the formation of proppant particles loaded with encapsulated dye materials and measuring of release of those dye materials. In such examples, the encapsulated dye and the corresponding dye release profile may be considered as a proxy for encapsulated microbial consortia and/or other treatment products and release profiles of such products.

Example 1

A lightweight proppant core was formed. Kaolinite (120 g) and iron oxide (5 wt. % kaolinite) were weighed out. This mixture was roll milled at 60 rpm for 24 hours at room temperature with deionized water and approximately 50 vol % of zirconia milling media. Powders were then dried and collected using a sieve combination (20/40 mesh). Following the rolling, two samples were synthesized: 1) high density; and 2) low density. Both samples were sintered at 1450 degrees C. for 40 minutes using a furnace (TF 1700, Across International, LLC, Livingston, N.J., USA). The heating and cooling rates were 5 degrees C./min. However, the high-density proppant was sintered in air and the low-density proppant was sintered at a low partial pressure of oxygen (PO$_2$). To create the low PO$_2$, hydrogen gas (20%) mixed with nitrogen gas (80%) (total gas flow rate=3 sccm/min) was bubbled through water at 20 degrees C. The water vapor and H$_2$ flowed to the tube furnace during the sintering process. The PO$_2$ at 1450 degrees C. was calculated as follows:

$$P_{O_2}(T) = \left(\frac{P_{H_2O}(T_b)}{P_{H_2}}\right)^2 e^{\left(\frac{2 \cdot \Delta G^0}{R \cdot T}\right)}$$

where PH$_2$O(Tb) is the vapor pressure of water at 20 degrees C., PH$_2$ is the partial pressure of hydrogen, ΔG$^0$ is the standard Gibb's free energy of reaction, R is the gas constant, and T is the temperature (1450 degrees C.) in the tube furnace. The sintered proppant was sieved in a 20/40 mesh sieve set.

The cross section of the proppant was imaged using a scanning electron microscope (SEM, S-3000N, Hitachi, Schaumburg, Ill., USA) after mounting in epoxy and polishing. To mount the sample, the proppant was immersed in epoxy overnight. The sample was subjected to grinding and polishing by using an automatic polisher (TegraPol-11, Struers, Cleveland, Ohio). The density of the proppant was measured by using the Archimedes method.

Figure 5:
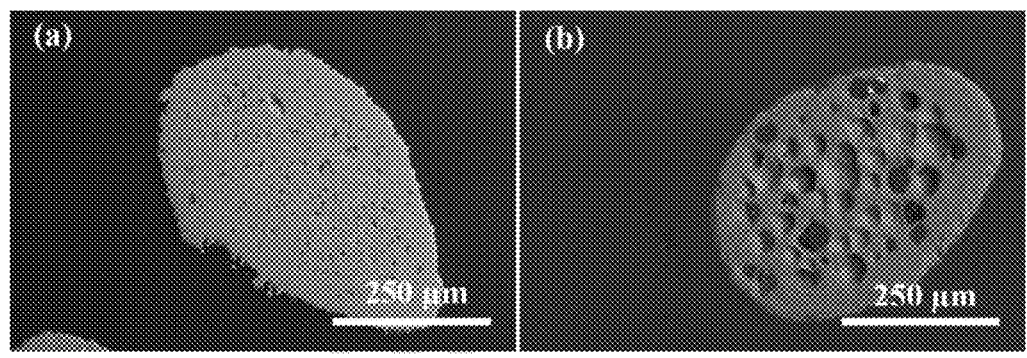
FIG. 5 shows SEM images of proppant cores formed in a normal atmosphere as compared to a reduced atmosphere.

SEM images of the high and low density proppant cores are shown in FIG. 5, with the air sintered proppant shown in (a) and the low density reducing atmosphere sintered proppant shown in (b). The high-density proppant (2.55 g/mL) was sintered in an air (PO$_2$ of 0.20 atm), resulting in a 7.1% volume fraction of pores. These pores were small with an average size of 5.2+/−1.2 μm in diameter. However, the proppant sintered in a reducing atmosphere with low PO$_2$ (1.08×10$^{-11}$ atm), showed a much larger pore size (32.8+/−8.0 μm) with an increased volume fraction of pores (45.3%). The dry bulk density of the proppant sintered under reducing conditions was 1.78 times lower and open porosity was 6.38 times greater than the proppant sintered in air (see Table 1).

TABLE 1

| PO$_2$ (atm) | Bulk density (g/cm$^3$) | Open porosity (%) |
|---|---|---|
| 0.20 | 2.55 (+/−0.13) | 7.1 (+/−0.8) |
| 1.08 × 10$^{-11}$ | 1.43 (+/−0.15) | 45.3 (+/−5.4) |

Example 2

To produce the polymer encapsulation, two solutions were prepared in deionized (DI) water: calcium lactate (92 mM, pH 7) and sodium alginate (25 mM, pH 7). The sintered proppant was added to the calcium solution (~100 mL) and added to the alginate solution dropwise. After a few seconds, the encapsulated particles were transferred to DI water for 60 seconds, to terminate the reaction. Particle diameter before and after encapsulation was measured using an optical microscope.

During the calcium alginate polymerization process, the polymer forms due to ionic interaction between divalent calcium ions and the carboxyl groups of the alginate. A rhodamine 6G dye is dispersed in a calcium lactate solution. This solution, including a proppant particle, is added dropwise to a sodium alginate solution. The encapsulated particle is placed in water to terminate the polymer growth once the particle reaches the desired dimension in the alginate solution.

Figure 6:
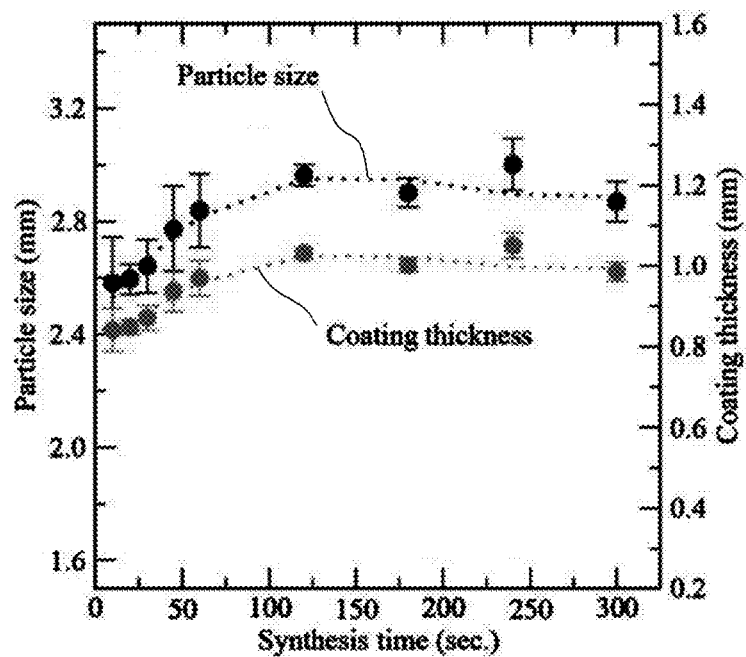
FIG. 6 graphically illustrates proppant particle size over time during a polymer encapsulation process.

The droplets containing the proppant particle and the calcium lactate were left in the sodium alginate solution for up to 300 seconds. The resulting encapsulated particle size increased from 2.58 mm at 10 seconds to 2.85 mm at 300 seconds (see FIG. 6). The coating thickness was measured by subtracting the initial nominal proppant diameter from the measured encapsulated particle dimension.

Calcium is the limiting reactant and is initially present with the proppant particle. As polymerization proceeds the $Ca^{2+}$ ion must diffuse through the gel to the surface where it can react with the alginate polymer strands in solution to grow the encapsulating layer. This dependence on $Ca^{2+}$ ion diffusion explains the observed high initial rate of growth that slowly plateaus once the $Ca^{2+}$ ions in the initial droplet are exhausted.

Example 3

Rhodamine 6G dye is used as a proxy representing a microbial consortium loaded onto the proppant particles. Efficiency of dye retention during polymerization of the encasement layer is measured in this example. The initial concentration of dye is known. The "unused" concentration of dye (remaining in the alginate solution) during polymerization is measured by UV-Vis spectroscopy after removing the encapsulated particles. This provides an estimate of the efficiency of dye retention during polymerization. Direct measurement and application of Beer's law gives the efficiency of encapsulation ($\alpha$) at 528 nm:

$$\alpha = \frac{[R6G]_i - [R6G]_f}{[R6G]_i} \cdot 100\%$$

where $[R6G]_i$ is the concentration of the rhodamine 6G dye loaded into the calcium lactate solution, and $[R6G]_f$ is the concentration of the dye remaining in the sodium alginate solution after the encapsulated particles are removed and added to water.

The amount of encapsulated dye after polymerization was calculated by subtracting the leftover dye lost to the sodium alginate solution from the initially loaded dye. Overall, the encapsulation process was very efficient for the initial concentration of dye that was considered. However, with increased polymerization time, the encapsulation efficiency was slightly reduced. For example, there was 99% retention for a 10 second polymerization step and this was reduced to 97% after a 600 second polymerization (see FIG. 7). This high efficiency can be explained by the calcium solution immediately forming a gel when placed in contact with the sodium alginate solution. The gel largely immobilizes the dye during the remaining polymerization step.

Figure 7:
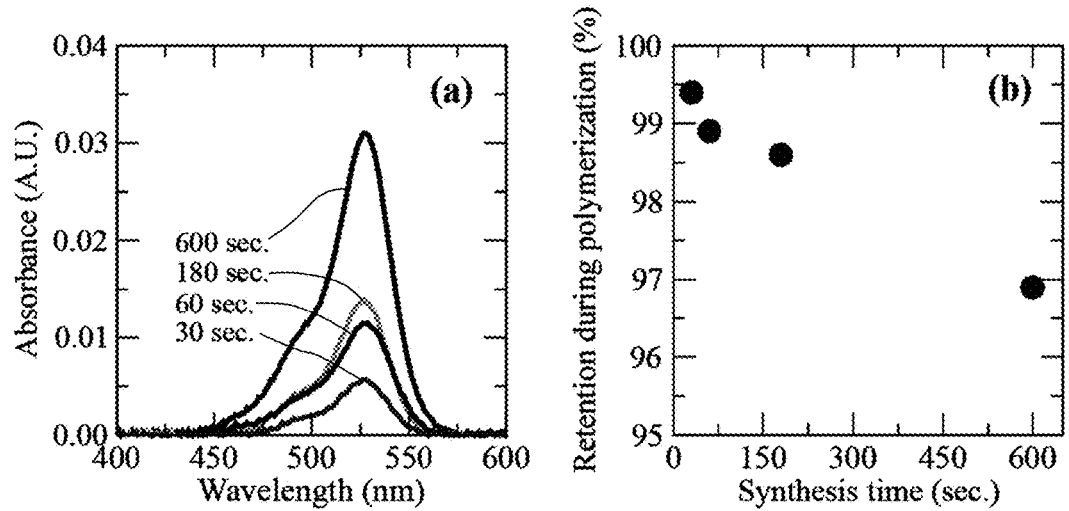
FIG. 7 graphically illustrates UV-Vis (ultraviolet-visible spectroscopy) absorbance profiles at various times after encapsulating a dye, and dye retention by the polymer encasement.

FIG. 7 depicts (a) the ultraviolet-visible spectrograph of the non-encapsulated rhodamine 6G, which remained in lactate monomer solutions. The figure represents several different polymerization synthesis times, showing an increase in the dye molecule leftover in the monomer solution. FIG. 7 depicts (b) calculated efficiency of dye retention during the polymerization, as a function of polymerization synthesis time.

Example 4

Rhodamine 6G was housed within the proppant prior to encapsulation. The proppant sample was encapsulated in the same way as described above, except rhodamine 6G (0.57 mM) was first added to the calcium lactate solution (100 mL, 92 mM, pH 7). To create the encapsulation, the calcium lactate solution was added to the sodium alginate solution in a dropwise manner and immersed in the alginate solution for 600 seconds. The overall concentration of the dye, released from three encapsulated particles, was 10 µM in a 2 mL cuvette. The loaded concentration of the dye for three particles was calculated to be 0.57 mM.

The time release of dye, rhodamine 6G, from the encapsulation was studied by incorporating the main chemicals in the hydraulic fracturing aqueous base fluid at a representative pH. These included potassium chloride (KCl), and ammonium persulfate (($NH_4$)$_2$$S_2$$O_8$). Ammonium persulfate is generally used as a commercial gel polymer breaker. As per the methods described above, the dye is immobilized and the proppant is encapsulated by this polymerization. Ultraviolet-visible (UV-Vis, Lambda 950, PerkinElmer, Waltham, Mass.) spectroscopy was utilized to measure the release time of rhodamine 6G from the encapsulation. Three encapsulated particles were placed in the bottom of the quartz cuvette and the height of the cuvette was adjusted to avoid the incident beam. Because the average size of encapsulation was 2.8 mm, the volume of gel section (8.2 µL) was calculated by subtracting the proppant. By multiplying the gel volume by three, the total loadable volume was estimated.

The UV-Vis could detect rhodamine 6G up to 10 µM. When the loaded dye is released in the cuvette, the total concentration of suspension should not exceed 10 µM. Based on the calculation, 0.57 mM of dye was loaded in the encapsulation. Once the encapsulation particles were loaded in the cuvette, the desired solution was added to the cuvette. The solutions were DI water at pH 3 to 11, potassium chloride (KCl, 13 to 46 mM), and ammonium persulfate (($NH_4$)$_2$$S_2$$O_8$), 15 mM). The absorbance of UV-Vis was measured every 60 seconds for 13 hours at 528 nm. Separate experiments were performed under different pH levels, potassium chloride concentrations and ammonium persulfate (($NH_4$)$_2$$S_2$$O_8$), 15 mM) to assess the time release of the dye. The counter ions would be binding to the alginate; and, the calcium ion, binding to the alginate to form a gel, would be released due to the counter ions. During time release, calcium dissociation was quantified by measuring the calcium ion concentration using a calcium ion-selective electrode (CA-BTA, Vernier, Beaverton, Oreg.).

Figure 8:
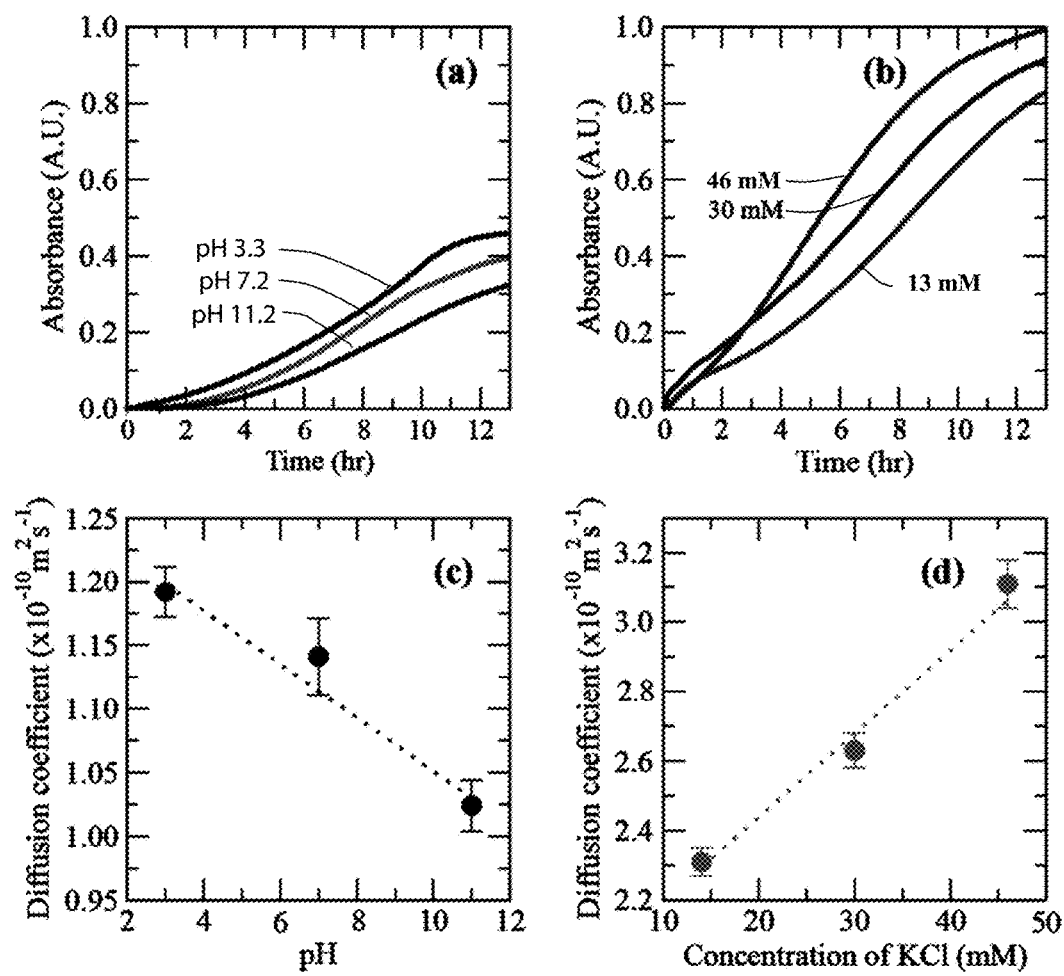
FIG. 8 graphically illustrates UV-Vis absorbance profiles and diffusion coefficients for encapsulated dyes over time for various pH levels and various KCl concentration levels.

When encapsulated proppant particles were exposed to DI water adjusted to pH 3.3, 7.2, and 11.2, the rate of dye release from the encapsulated proppant particles was roughly linear with respect to time for the first ~10 hours before reaching a plateau (See FIG. 8). Dye was released more rapidly from encapsulated proppant when the surrounding aqueous environment had a lower pH. After 13 hours, the detected concentration of the dye, as detected by UV-Vis, was 4.7 µM in the pH 3 solution, and 3.6 µM in the pH 11 solution. As seen in FIG. 8, the rate of release of dye from the polymer on the proppant surface was higher for lower pH solutions. The rate of increase in the amount of a material in a solution, dissolving from a solid and assuming a spherical boundary condition, is expressed by the Noyes-Whitney equation as follows:

$$\frac{M_t}{M_a} = 4 \cdot \sqrt{\frac{D \cdot t}{\pi \cdot \delta^2}}$$

where $M_a$ is the initial dye concentration (µM) in the solution, $M_t$ is the concentration of dye in the solution at time t, D is the diffusion coefficient (m²/s), and δ is the thickness of the polymer coating (m). Setting the slope of the linear portion of the absorbance vs. time plot equal to $M_t/M_a$, the diffusion coefficient was calculated for different pH values.

The release rate of dye was monitored in potassium chloride (KCl) suspension ranging from 13 mM to 46 mM. The dye was released more rapidly in the 46 mM suspension than the 13 mM suspension. The diffusion coefficient for dye as a function of KCl concentration was calculated in the same manner as it was for solutions with different pH values.

FIG. 8 depicts the time release of rhodamine 6G from the encapsulation system as measured by (a) pH levels and (b) concentration of KCl. Release time is delayed as pH increases and concentration of dye released increases as the pH decreases. As pH is lowered, additional protons begin to interact and attach to the carboxyl group in the alginate gel. The alginate stability is then influenced by the addition of cations such as protons or $K^+$ ions.

Figure 9:
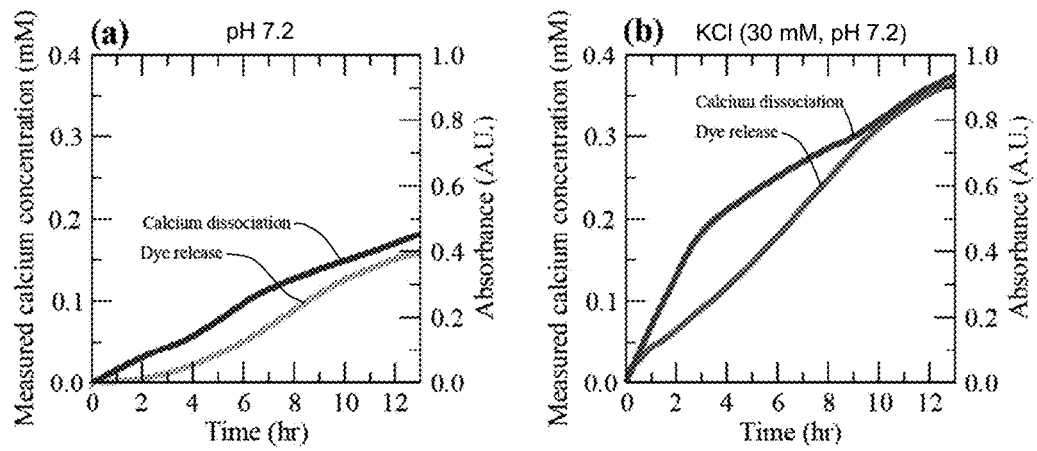
FIG. 9 graphically illustrates calcium dissociation and dye release over time according to UV-Vis absorbance and measured calcium ion concentration.

Ion exchange with a proton or a $K^+$ ion should result in the gradual loss (dissociation) of $Ca^{2+}$ from the polymer as a function of time. To verify this, encapsulated samples were suspended in water at pH 7.2 and in KCl solution (30 mM, pH 7.2) for 13 hours with continuous calcium concentration measurement (see FIG. 9). In both instances the $Ca^{2+}$ ion concentration increased coincidently with the dye release suggesting that ion exchange was a viable mechanism for the increased dye release. FIG. 9 depicts measure calcium concentrations due to gel dissociation in (a) water at pH 7.2 and (b) KCl (30 mM, pH 7.2) plotted alongside the dye release as a function of time.

Dye-laden encapsulated proppant particles were also exposed to commercial gel breakers. The breakers considered included ammonium persulfate. The purpose was to observe dye release as a function of time in the presence of additives that are consistently present in fluids used for hydraulic fracturing. UV-Vis spectroscopy demonstrated the encapsulation rapidly released the dye in ammonium persulfate suspension. In comparison to the potassium chloride suspension, the ammonium persulfate suspension released the dye 17 times faster. This indicated the alginate was more favorable to interact with ammonium cation than potassium cation. However, after a short time (~0.4 hours) the rhodamine 6G signal began to decrease. This suggested that the ammonium persulfate was oxidizing the dye molecule itself.

The thickness of the encapsulation layer can be controlled as a function of polymerization time; this thickness ranged from 0.8-1.3 mm in a hydrated environment. The efficiency of encapsulation was found to be better than 97%, meaning only 3% of the rhodamine 6G molecules were lost to the polymer solution, even for the longest polymerization times. Diffusion coefficients for the release of rhodamine 6G through the encapsulation layer were found to range from $1.0 \times 10^{-10}$ cm²·s⁻¹ to $3.2 \times 10^{-10}$ cm²·s⁻¹.

Diffusion coefficients were larger in low pH and high salinity solutions and were found to linearly depend on the concentration of cations, such as $H^+$ or $K^+$, capable of ion-exchange with $Ca^{2+}$ ions in the calcium alginate polymer. Calcium dissociation from the polymer was directly observed to be coincident with ion exchange and enhanced dye release. The measured release time (13 hours) was within an acceptable time window for the application in hydraulic fracturing operations. Complete dye release occurred after ~13 hours suggesting the viability of the stimulant-laden polymer encapsulated porous proppant for microbe-enhanced coalbed methane recovery.

Example 5

Figure 11:
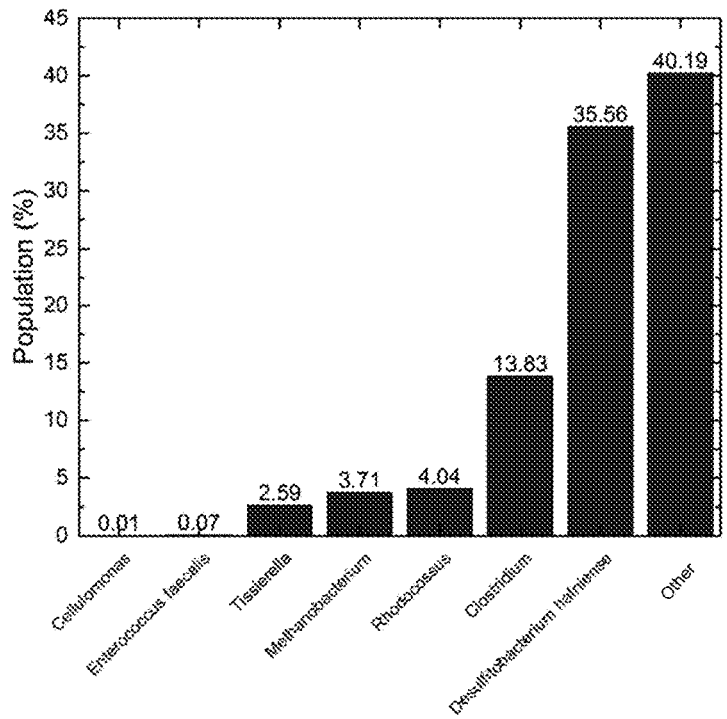
FIG. 11 illustrates a population profile of an exemplary microbial consortium which may be encapsulated within a proppant material as described herein.

This example was carried out to determine preferred nutrient media concentrations and to determine whether a bacterial consortium (population profile shown in FIG. 11) could grow within an encapsulation system. Concentration of a TSB nutrient solution was varied from 0 g/L to 45 g/L. The operation temperature, pH, encapsulation size, and growth time were constant. The TSB nutrient, bacteria, calcium lactate, and sodium alginate solutions were pH 7. The operation temperature was room temperature. The overall size of encapsulation system, including proppant, was 1 mm. The bacteria were grown inside the encapsulation system for two days at room temperature. After two days, the bacteria, following release from the encapsulation, were counted to find the optimized concentration of nutrient for growth.

The encapsulated bacteria were quantitatively counted by plotting the optical density as a function of bacteria count. The number of bacteria was counted by using the direct microscopic count method. The bacteria solution was diluted with normal saline. The ultraviolet-visible (UV-Vis) spectroscopy measured the diluted solutions at 600 nm.

The microbial consortium, TSB solution, and calcium lactate (2 wt. % calcium lactate in DI water) were mixed. The volume ratios of bacteria, nutrient, and calcium lactate solutions were 1:1:1. The ceramic proppants (20/40 mesh) were immersed in the mixture for 30 minutes at room temperature. Then, using the metal screen, the proppant was transferred to sodium alginate solution (0.5 wt. % sodium alginate in DI water). The solution was stirred at 300 rpm for 30 minutes. The encapsulated bacteria samples were transferred from the alginate solution to DI water. After 15 minutes, the samples were transferred to an opened glass vial and stored at room temperature for two days.

The encapsulated bacteria were immersed in 2 mL of DI water at pH 7 for 24 hours. The transmittance at 600 nm ($T_{600\ nm}$) measured the solution using ultraviolet-visible (UV-Vis) spectroscopy. The transmittance was converted to optical density ($OD_{600}$) as follows:

$$OD600 = \log\frac{1}{T_{600\ nm}}$$

(R-square value was 0.9908) where ($OD_{420}$) was the optical density at 420 nm, C was the bacteria concentration (bacteria/mL).

Figure 10:
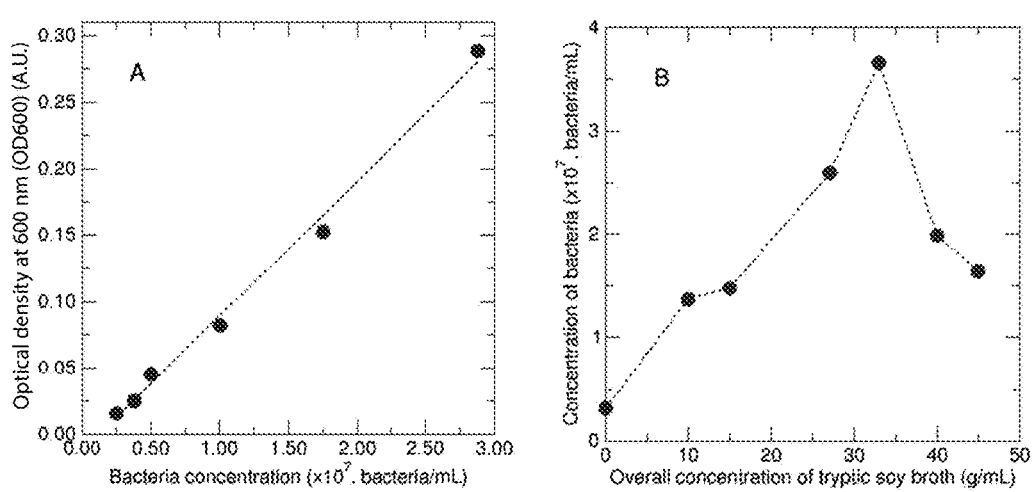
FIG. 10 graphically illustrates bacterial concentration according to concentration of growth media.

As shown in FIG. 10 (graph B), the population rose with increasing nutrient media concentration up to a concentration of 33 g/L. The reduction in population at higher TSB concentrations may be caused by an overabundance of sodium chloride at these levels, which likely affects the stability of the microbial cell membrane. As shown, growth was optimized when the overall concentration of NaCl was 5.5 g/L. For reference, tryptic soy broth nutrient has sodium chloride by 17 wt. %, which means TSB at 33 g/L equals 5.5 g/L of NaCl.

Example 6

This example was conducted to measure the recovery of fracture conductivity resulting from microbial activity in a proppant pack intentionally damaged by entrainment of coal fines. A washed microbial consortium (20 mL at pH 7.0) in normal saline solution (8.9 g/L NaCl, pH 7.0) was added to a calcium lactate solution (2 g/L, 20 mL, pH 7.0). Nine g of proppant were immersed in this mixture for 30 minutes at room temperature. The proppant was then transferred to a sodium alginate solution (0.4 g/L, 20 mL, pH 7.0) by using a screen. The alginate solution was stirred at 300 rpm for 30 minutes at room temperature. Then, the encapsulated sample was added to DI water at pH 7.0 and stirred at 300 rpm for 10 minutes.

To assemble the chamber for conductivity measurement, autoclaved coal (1.2 g), the encapsulated proppant (9 g), nutrient (0.9 mL), and a salt solution (1.6 mL) were added to a cylindrical chamber (5 cm in height and 2.5 cm in diameter). The nutrient contained TSB (15 g/L) at pH 7.0. The salt solution was made with sodium chloride (NaCl, 2.6 g/L at pH 7.0). Three sample sets were prepared: a control at 20° C., a sample including the consortium at 20° C., and a sample including the consortium at 36° C. The chambers were incubated in a water bath with controllable temperature. Each set was used to prepare 21 chambers, and each data point indicated the average of three measurements and standard deviation.

The conductivity was calculated from the difference between inlet and outlet flows, chamber cross-sectional area and the pressure drop. The position of measurement was horizontal. During the conductivity measurement, the flow rate of fluid is controlled by the water level height and the head was calculated according to standard hydrostatic pressure considerations. The measured flow rate was 0.1 mL/min. at the outlet atmospheric pressure in Salt Lake City, Utah (the altitude is 4,300 ft. giving a nominal atmospheric pressure of 12.6 psi).

Figure 12:
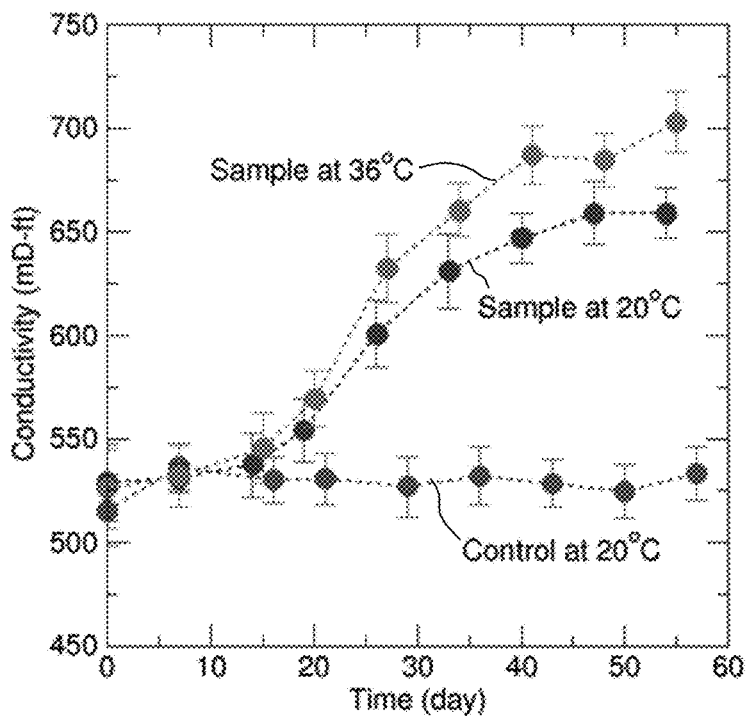
FIG. 12 graphically illustrates hydraulic conductivity over time through proppant packed chambers intentionally entrained with coal fines, showing increases in conductivity for chambers packed with proppant particles providing microbial release as compared to control proppant particles.

FIG. 12 illustrates the results, showing that released microbes from the encapsulated particles interacted with the coal fines entrained within the proppant packs and significantly improved the permeability of the pack. It is hypothesized that the microbes increased the interstitial flow paths by consuming the coal fines.

The invention claimed is:

1. A proppant particle, comprising:
   a core having a plurality of inner pores;
   a shell surrounding the core and including a plurality of shell pores, the shell pores being configured to house a treatment product capable of application to a subterranean formation; and
   a polymer encapsulation layer surrounding the shell, the polymer encapsulation layer being permeable to the treatment product such that the treatment product is released over time to an exterior side of the polymer encapsulation layer, the polymer encapsulation layer including a microbial growth solution.

2. The proppant particle of claim 1, wherein the inner pores have a first average size and the shell pores have a second average size, the second average size being smaller than the first average size.

3. The proppant particle of claim 1, wherein the inner pores have an average size of about 20 μm to about 60 μm and the shell pores have an average size of about 3 μm to about 20 μm.

4. The proppant particle of claim 1, wherein the treatment product includes bacteria.

5. The proppant particle of claim 4, wherein the bacteria include a consortium capable of converting hydrocarbons within the subterranean formation into methane.

6. The proppant particle of claim 5, wherein about 1% to 10% of the consortium is made up of methanogenic bacteria.

7. The proppant particle of claim 1, wherein the microbial growth solution is tryptic soy broth.

8. The proppant particle of claim 7, wherein the tryptic soy broth is included at a concentration of about 20 g/L to about 40 g/L.

9. The proppant particle of claim 1, wherein the core is formed from a kaolinite and iron oxide mixture.

10. The proppant particle of claim 1, wherein the shell is formed from an aluminum oxide.

11. The proppant particle of claim 1, wherein the polymer encapsulation layer is formed from calcium alginate.

12. The proppant particle of claim 1, wherein the proppant particle has a bulk density of about 1.4 $g/cm^3$ to about 2.5 $g/cm^3$.

13. The proppant particle of claim 1, wherein the inner pores cover about 30% to 50% of the surface area of a cross-section of the core.

14. A proppant composition comprising a plurality of proppant particles, each proppant particle comprising:
   a ceramic core having a plurality of inner pores;
   a ceramic shell surrounding the shell and including a plurality of shell pores, the shell pores having an average size smaller than the inner pores, the shell pores being configured to house a treatment product including a methanogenic bacterial consortium capable of converting hydrocarbons within a subterranean formation into methane; and
   an alginate encapsulation layer surrounding the shell, the encapsulation layer providing release of the bacterial consortium over time, the encapsulation layer including a growth media to promote microbial growth.

* * * * *